Figure 1:
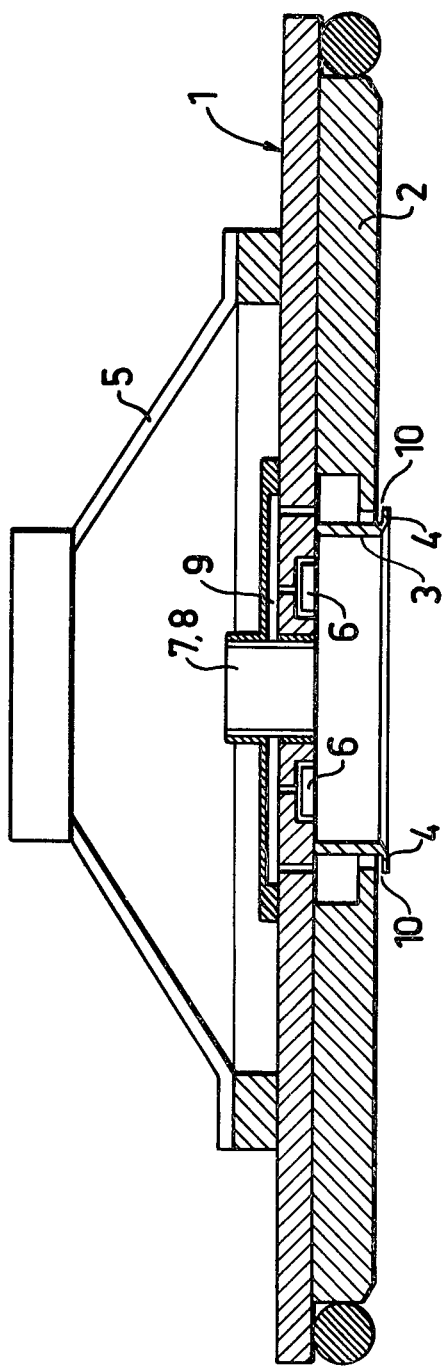

United States Patent [19]

Karlsson et al.

[11] 4,235,102
[45] Nov. 25, 1980

[54] METHOD AND APPARATUS FOR MEASURING THE RATIO BETWEEN WEB TENSION AND SUBSTANCE

[75] Inventors: Håkan I. Karlsson; Leif T. Östman, both of Spånga, Sweden

[73] Assignee: Svenska Traforskningsinstitutet, Sweden

[21] Appl. No.: 18,916

[22] Filed: Mar. 9, 1979

[30] Foreign Application Priority Data

Mar. 10, 1978 [SE] Sweden ............................ 7802788

[51] Int. Cl.³ ........................ G01L 5/10; G01H 13/00
[52] U.S. Cl. ........................................ 73/143; 73/581
[58] Field of Search ........... 73/143, 579, 581, DIG. 1, 73/580, 582, 583

[56] References Cited

U.S. PATENT DOCUMENTS

| 2,729,972 | 1/1956 | Schwidetzky | 73/583 |
| 3,470,734 | 10/1969 | Agdur et al. | 73/580 X |
| 3,850,031 | 11/1974 | Schwenzfeier et al. | 73/143 |
| 3,854,329 | 12/1974 | Jones | 73/143 |
| 3,871,217 | 3/1975 | Miley | 73/143 |
| 4,109,520 | 8/1978 | Eriksson | 73/143 |

FOREIGN PATENT DOCUMENTS 1096991  12/1967  United Kingdom ..................... 73/579

Primary Examiner—Charles A. Ruehl
Attorney, Agent, or Firm—Lerner, David, Littenberg & Samuel

[57] ABSTRACT

A method and apparatus is provided for measuring the ratio between web tension and web substance by causing the web to vibrate at its resonance frequency, measuring the pressure variations or the signal causing the web vibration to produce a first signal, measuring a signal in phase and representative of the vibration of the web and to produce a second signal, comparing the phase difference of the first and second signals so that a deviation from a predetermined phase difference produces an output signal, and controlling the frequency of the signal or pressure variations causing the web to vibrate in response to the output signal so that the predetermined phase difference is maintained.

10 Claims, 5 Drawing Figures

METHOD AND APPARATUS FOR MEASURING THE RATIO BETWEEN WEB TENSION AND SUBSTANCE

This invention relates to a method and an apparatus for measuring the web tension or substance of paper, foils or the like.

During the manufacture or processing of paper, foils or the like, the material in the form of a web is drawn between conducting rollers, which deflect the web and effect its suspension. It is, therefore, of great importance that the tension in the web be kept within definite limits in order to prevent breaks in the web. It is also essential to maintain the web tension at the same level across the web in order to avoid fold formation or other unfavourable effects. It is, therefore, desirable to be able to measure the web tension continuously in various places along the web and also in various places in the transverse web direction. By measuring the web tension continuously, the tension can be adjusted so that the aforesaid drawbacks are prevented.

The web tension gauge most widely used in modern machines, particularly in printing presses where paper or plastic webs run over deflecting rolls, is a load cell of some kind, on which the rolls are supported at both ends. Upon the deflection of the web, forces arise which are indicated by the load cells and can be utilized for determining the web tension. For enabling the cells to measure rapid variations in the web tension, the weight of the rolls must be as low as possible. This is incompatible with the fact, that mechanic vibrations always occur when the rolls rotate and thereby cause interferences in the measurement signal, and for this reason the rolls must be designed rigid so as to reduce the vibrations, i.e. the rigid structure in its turn implies a high weight of the rolls, especially in machines of great width. Consequently, that part of the force acting on the load cells which originates from the web tension, is very small in relation to the weight of the rolls. The sensitivity requirements on the load cells, therefore, are very high and cause serious problems.

In another type of web tension gauge the entire web between two rolls is caused to vibrate transversely. In this type use is made of the fact, that the resonance frequency for a web has a definite relation to the tension in its material. This relation can be expressed as follows $$f = \frac{n}{2l} \sqrt{\frac{T}{m}}$$

where
f = resonance frequency
T = tension in the material
n = overtone at which the web is in resonance
l = distance length between support points of the web
m = mass/unit area (substance) for the web When for a definite web n, l and m are held constant, the following relation is obtained $$f = k\sqrt{T} \text{ or } T = kf^2$$

At these known web tension gauges, consequently, the resonance frequency is measured which is a measure of the web tension.

There also exists other known devices, at which an intermittent vibration is applied to a portion of the web, and the time for the vibration to run to another point in the web is indicated. This running time has a special relation to the web tension.

Both aforesaid methods have the disadvantage of being too sensitive to external interferences such as noise. Since the methods are to be applied in an extremely noisy environment, the noise must be screened off at the place of measurement, which is both troublesome and expensive. Moreover, overtones are formed which at measurements often are indicated instead of the fundamental indicating the web tension. As a consequence thereof, the result obtained from an instrument operating according to the aforesaid principle often is entirely misleading. These methods, therefore, have not been utilized in practice to a great extent.

According to still another type of web tension gauge, the web is caused to vibrate transversely between two support places with a periodically varying force having a definite amplitude and frequency. The vibration amplitude of the web is measured and is a measure of the web tension. The frequency of the force shall be either slightly above or slightly below the expected fundamental resonance frequency for the web at the web tensions in question, i.e. the web tension at which resonance occurs shall be either slightly higher or slightly lower than every expected tension of the web. The measuring range then will be within a range where small variations in the web tension give rise to great changes in the amplitude. By measuring the amplitude, the web tension can be obtained by means of a calibration curve. It is, thus, necessary to carry out calibration in order to obtain a frequency providing a suitable measuring range. If the web tension should vary outside the measuring range, the frequency must be changed and a different calibration curve be used. The amplitude detection, furthermore, is unsafe, primarily because of high temperature sensitivity.

The disadvantages of the aforesaid methods are eliminated by the present invention, which utilizes the relation between the resonance frequency and the ratio between the web tension and the substance and the phase shifting, which prevails between the web vibration and the pressure variations causing the web to vibrate or the signal bringing about the pressure variations.

When in the above relation only n and l are kept constant, then $$f = k\sqrt{\frac{T}{m}}$$

The resonance frequency, thus, is proportional to the square root of the ratio between web tension and substance. It is, thus, possible with the apparatus according to the invention to obtain the web tension by a separate measurement of the substance. Invertedly, the substance can be obtained by a separate measurement of the web tension. This can be accomplished in practice by combining the gauge according to the invention with another web tension and, respectively, substance gauge.

The characterizing features of the invention become apparent from the attached claims.

The gauge according to the invention has many advantages, for example high accuracy, no limitations of the measuring range, no risk of overloading the measuring head, high stability, small zero point drift, and no hysteresis.

The measuring head simply can be applied to the web and be used in any optional place in a machine. The head is insensitive to mechanic vibrations, electric interferences and temperature variations, it has no inertia and measures even rapid variations in web tension. It is further possible to continuously blow cleaning air through the measuring head without appreciably interfering with the measuring operation. The measuring head has small dimensions, low weight and is suitable for being moved along the web for measuring web tension profiles.

The measuring system can be adapted to the prevailing demand. A simple gauge with one measuring head can be designed to be held in ones hand and be used for checking and controlling a smaller machine or for surveying tensions in a larger machine. Especially it is possible to position a series of measuring heads across the web in several places along the same when the web path is long, for example in a papermaking machine or printing press for daily newspapers, and to indicate the output signals from the heads on a common instrument panel.

Figure 2:
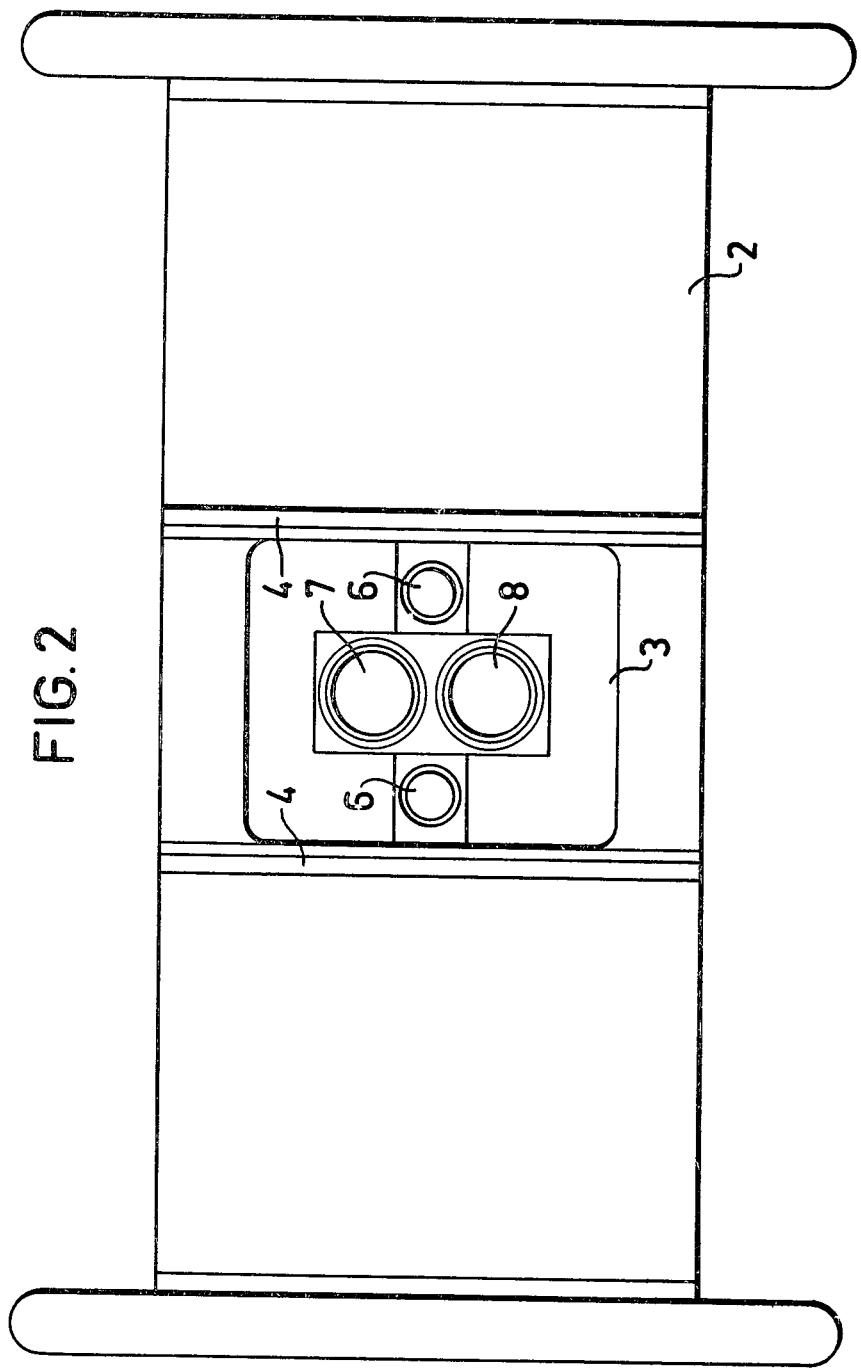
Figure 3:
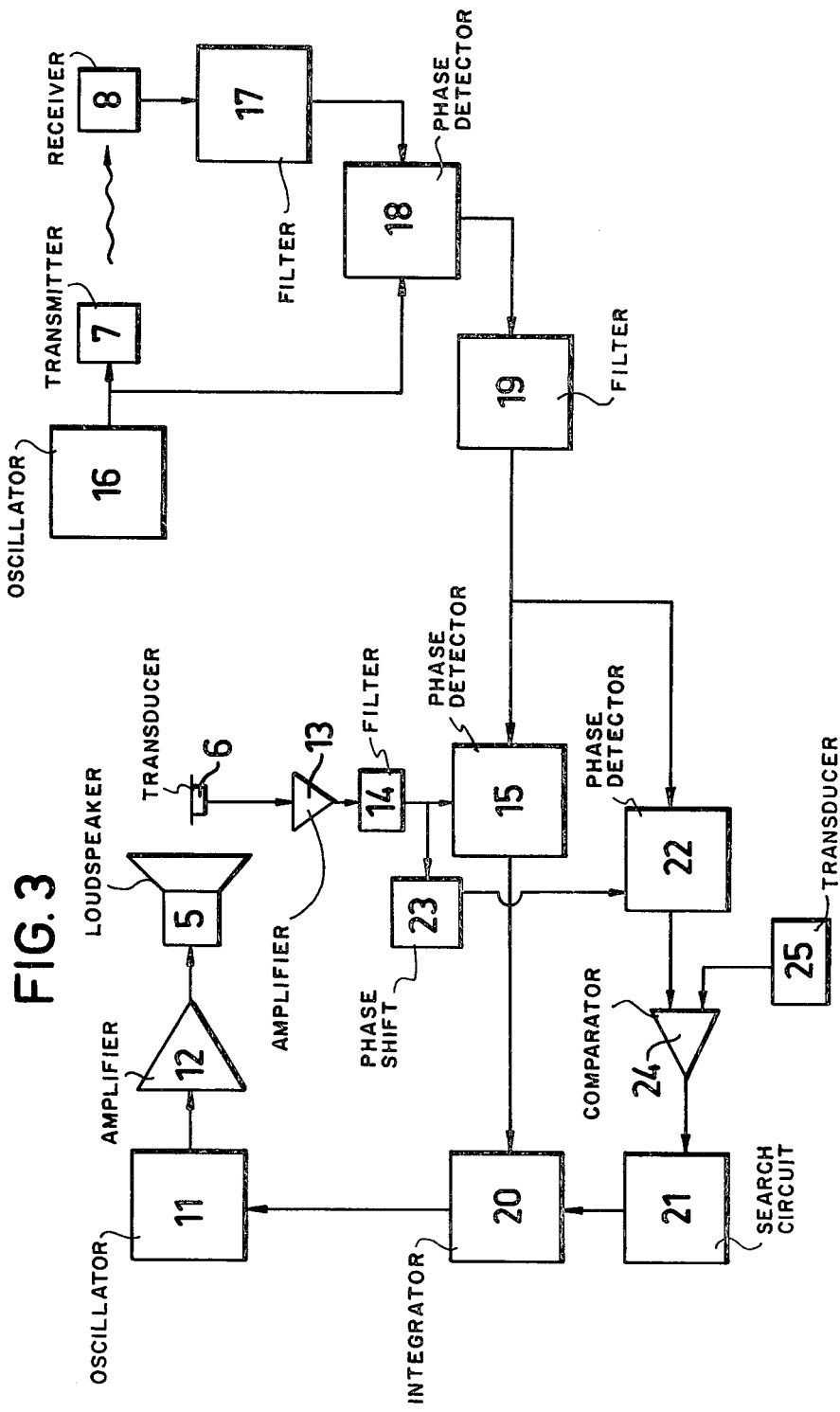
Figure 4:
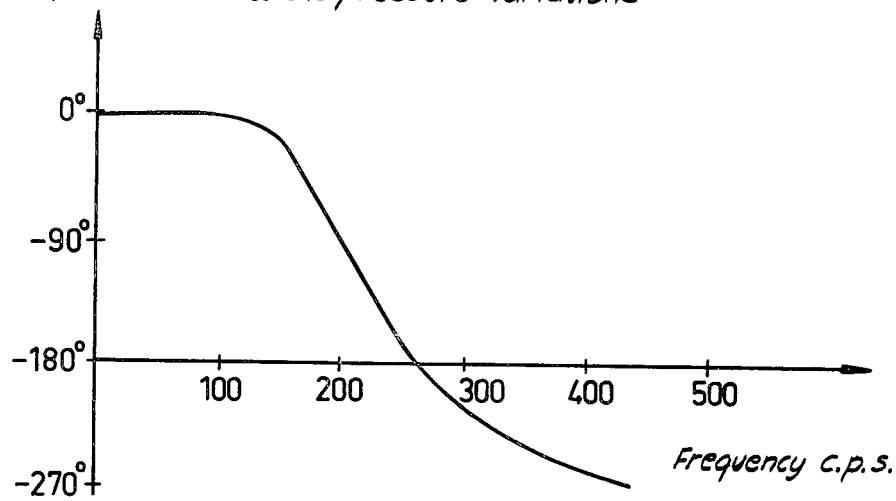
Figure 5:
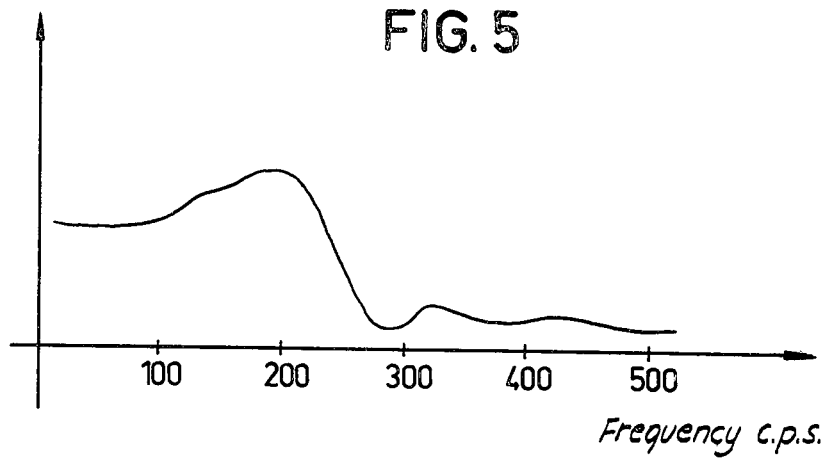

The invention is described in greater detail in the following, with reference to the accompanying drawings, in which FIG. 1 is a cross-section through a gauge according to the invention, FIG. 2 is a view from below of the gauge shown in FIG. 1, FIG. 3 is a block diagram for an apparatus according to the invention, FIG. 4 shows the phase difference between the web movement and the driving pressure variations as a function of the frequency, FIG. 5 shows the vibration amplitude of the web at different frequencies.

In FIGS. 1 and 2 an embodiment of the gauge according to the invention is shown. The measuring head 1 comprises a plate 2 intended to abut the web. The plate is formed with a central measuring gap 3 limited by two parallel elevations constituting supports 4 for the web. The web, which is movable, passes transversely over the supports.

On the upper surface of the plate a loudspeaker 5 is located, which causes the web by a periodically varying sound pressure to vibrate transversely between the supports.

The loudspeaker is attached so that the entire sound pressure passes down into the measuring gap 3, which is open to the sides so that a wave with a propagation direction in parallel with the supports 4 disappears without being reflected.

In the measuring gap 3 two pressure transducers 6 are located, which are intended to measure the varying sound pressure from the loudspeaker 5. In said measuring gap further are located a supersonic transmitter 7 and a supersonic receiver 8, which are positioned centrally between the supports 4 where the web deflection is greatest.

Air passageways 9 extending to the supersonic transmitter and receiver and to the pressure transducer maintain said instruments clean of dust and dirt.

The supports 4 are provided with slots 10, through which compressed air flows out. The outflowing air produces an air cushion on the flat portion of the plate 2. Due to the air stream, the web is held against the plate with low friction, which is essential for affecting the web tension at minimum. On the supports 4 proper, there is no air cushion, but here the web sweeps against the gauge. Thereby the vibration generated by the loudspeaker is reflected between the supports, and a good resonance is obtained.

FIG. 3 is a block diagram for an apparatus according to the invention. A voltage-controlled oscillator 11 emits a periodically varying signal, which is amplified in an amplifier 12 and produces sound in the loudspeaker 5. The periodically varying sound from the loudspeaker 5 is measured by the pressure transducer 6, which is connected to an amplifier 13, from which the signal passes through a filter 14, which adapts to the frequency of the signal. The signal is transferred from the filter to a phase detector 15. A phase detector is a circuit, which emits an output signal depending on the phase difference between two periodic input signals. At 90° phase difference the output voltage from the phase detector is 0 volt. When one signal is shifted positively or negatively relative to the other signal, a positive and, respectively, negative voltage arises at the output. The input signal from the pressure transducer 6 to the phase detector 15, thus, has the same phase position as the sound from the loudspeaker 5, i.e. the sound which causes the web to vibrate.

The supersonic transmitter 7 is driven by an oscillator 16 with a signal of high frequency, for example 41 kHz. The signal reflected from the web is caught by the supersonic receiver 8, whereby the signal received assumes a frequency and phase, which due to the vibration of the web are different from the signal emitted. The signal passes from the receiver 8 through a filter 17. The emitted and received supersonic signals are fed into a phase detector 18. The output signal from the phase detector 18 is passed through a low-pass filter 19 and is then a signal, which directly describes the vibration movement of the web with respect to its amplitude and phase. This signal is fed to the phase detector 15 and there compared with the signal from the transducer 6. For detecting resonance vibration of the web, these signals shall be phase shifted 90°, i.e. the output voltage from the phase detector 15 shall be 0 volt.

The output signal from the phase detector 15, thus, depends on the phase difference between the input signals. This output signal is fed to an integrator 20, which integrates the deviation from 90° phase difference between the two input signals to the phase detector 15. The integrator 20 increases or decreases the voltage to the oscillator 11 in order to increase or decrease the frequency to the loudspeaker 5, so that the aforesaid deviation is eliminated. As soon as the resonance frequency for the web changes, i.e. the ratio between web tension and substance is changed, a phase angle signal from the phase detector 15 arises which forces the oscillator 11 to change the frequency to resonance.

As there may be overtones, to which the circuit may be locked, a search circuit 21 is provided which sweeps the frequency from zero upward. The search is disconnected at the first detected 90° phase shifting, and the integrator 20 holds the oscillator 11 on correct frequency. For being able to know when shifting from search to adapting is to take place, a quadrature phase detector 22 is provided, which scans the time when the frequency is correct. This detector 22 is fed with the pressure transducer signal via a 90° phase shift 23 and with the web vibration signal from the low-pass filter 19. The output signal from the quadrature phase detector 22 is compared in a comparator 24 with a reference level from a level transducer 25. When the reference level is exceeded, a signal is passed to the search circuit 21 so as to disconnect the search.

FIGS. 4 and 5 show by way of diagrams measurements from experiments with a gauge according to the invention. The web consisted of liner with the substance 112 g/m$^2$. The web tension was 40 N/m. The distance between the supports in the gauge was 50 mm. The frequency was swept from 0 cps upward. The frequency shall be controlled so that the phase difference is held on 90° phase shifting.

As an alternative to measuring the generated pressure variations with a special pressure transducer, the measuring can be carried out directly by means of the movement of the loudspeaker diaphragm. A further alternative is to utilize the signal, which brings about the pressure variations, i.e. the signal before the loudspeaker. This signal then shall be compared with the web vibration signal as described above.

It is also possible to indicate the transversal vibration of the web in a way other than by ultrasonics. The vibration of the web produces a varying pressure against the supports 4. A certain pressure, thus, corresponds to a definite vibration position of the web. By measuring the pressure, for example by means of pressure in the supports, the vibration of the web can be measured. Another possibility is to measure the vibration optically.

When the web material is magnetic, the pressure variations driving the vibration of the web can be brought about magnetically.

The invention, of course, is not restricted to the embodiment shown, but can be varied within the scope of the invention idea.

We claim:

1. A method of measuring the ratio between web tension and web substance comprising the steps of passing the web over spaced supports and causing the web to vibrate at its resonance frequency between the supports by periodic pressure variations, which frequency depends on the ratio between the web tension and substance, measuring the pressure variations or the signal bringing about the pressure variations and producing a first signal, measuring a signal in phase with the vibration of the web and producing a second signal, comparing the phase difference of said first and second signals so that a deviation from a predetermined phase shift produces an output signal, and controlling the frequency of the pressure variations in response to said output signal so that the predetermined phase shift is maintained.

2. A method as defined in claim 1, wherein the step of causing the web to vibrate by periodical pressure variations includes emitting sound from a loudspeaker, and the step of measuring includes measuring the sound generated by a pressure transducer.

3. A method as defined in claim 1, wherein the step of causing the web to vibrate by periodical pressure variations includes emitting sound from a loudspeaker, and the step of measuring includes measuring the sound generated by measuring the movement of the loudspeaker diaphragm.

4. A method according to any one of the claims 1 to 3, wherein the step of measuring the vibration of the web is performed by means of a supersonic beam, which is emitted against the web and reflected to a receiver, and that the phase difference between the emitted and the received supersonic beam is detected and produces said second signal, which is representative of the vibration movement of the web.

5. A method according to any one of claims 1 to 3, wherein the step of controlling the frequency of the pressure variations includes integration of said output signal.

6. An apparatus for measuring the ratio between web tension and web substance which apparatus comprises supports over which the web is passed, means located between said supports for generating periodical pressure variations to vibrate said web, first means for measuring the generated pressure variations or the signal effecting said pressure variations and producing a first signal, second means for measuring a signal in phase with the vibration of the web and producing a second signal, means for detecting the phase shift between the first and second signals received from said measurements, and means responsive to said detecting means for adjusting the frequency of the generated pressure variations so that a desired phase shift is maintained.

7. An apparatus as defined in claim 6, wherein said means for generating the periodical pressure variations is a loudspeaker spaced from said web, and wherein said first means for measuring said pressure variations is a pressure transducer located between said loudspeaker and said web.

8. An apparatus as defined in claim 6, wherein said means for generating the periodical pressure variations is a loudspeaker spaced from said web.

9. An apparatus as defined in any of the claims 6 to 8, wherein said second means for measuring the vibration of the web comprises a supersonic transmitter (7) and a supersonic receiver (8), which are located adjacent the web for emitting a supersonic signal against the web, and, respectively, receiving the signal reflected from the web, and means for detecting and transforming said signals to said second signal representative of the vibration movement of the web.

10. An apparatus as defined in any one of the claims 6 or 8, wherein said responsive means is an integrator.

* * * * *